Sept. 9, 1969      R. SCHWARTZ ET AL      3,465,443
ORTHOPEDIC RELATOR ASSEMBLY
Filed Feb. 20, 1967      3 Sheets-Sheet 1

ROBERT SCHWARTZ
HARRY N. COOPERMAN    INVENTORS

BY *Jerome E. Luebke*

ATTORNEY

Sept. 9, 1969   R. SCHWARTZ ET AL   3,465,443
ORTHOPEDIC RELATOR ASSEMBLY
Filed Feb. 20, 1967   3 Sheets-Sheet 2

ROBERT SCHWARTZ
HARRY N. COOPERMAN   INVENTORS

BY

ATTORNEY

Sept. 9, 1969   R. SCHWARTZ ET AL   3,465,443
ORTHOPEDIC RELATOR ASSEMBLY
Filed Feb. 20, 1967   3 Sheets-Sheet 3

ROBERT SCHWARTZ   INVENTORS
HARRY N. COOPERMAN
BY
ATTORNEY

United States Patent Office 3,465,443
Patented Sept. 9, 1969

3,465,443
ORTHOPEDIC RELATOR ASSEMBLY
Robert Schwartz, Rahway, N.J., and Harry N. Cooperman, Doylestown, Pa., assignors to Dental Orthopedics, Inc., a corporation of New Jersey
Filed Feb. 20, 1967, Ser. No. 617,272
Int. Cl. A61c 11/00
U.S. Cl. 32—32                                8 Claims

ABSTRACT OF THE DISCLOSURE

An orthopedic relator assembly useful in the formation of standardized diagnostic dental casts comprising a mandibular base member, a vertically disposed support member, the lower end of which is connected to the mandibular base member, a maxillary base member connected to the upper portion of the support member and an occlusal base member. The lower surface of the maxillary base member and the upper surfaces of the mandibular and occlusal base members lie in planes parallel to each other. The maxillary base member is preferably vertically movable in relation to the mandibular base member. The upper surface of the mandibular base member and the lower surface of the maxillary base member are provided with cast positioning means. The occlusal base is removably mounted on the upper surface of the mandibular base and the upper surface of the occlusal base is provided with a longitudinally disposed guide line, a pin holder positioned on said guide line and a movable knife edge.

---

This invention is directed to an orthopedic relator assembly useful in the formation of standardized diagnostic dental casts. More particularly, the invention is concerned with a simple mechanical assembly with which it is possible to obtain diagnostic dental casts whose bases are absolutely parallel to the dental plane of occlusion.

Diagonistic casts are very important tools for the dental practitioner. From diagnostic casts taken over a period of time, the dental practitioner attempts to determine if there has been any change in the curve of the spee and/or the plane of occlusion and precisely how much change has taken place. Additionally, the dental practitioner attempts to determine from a series of diagnostic casts taken periodically if a patient's teeth have shifted in the arch, whether the patient has suffered any loss of vertical dimension of his teeth and if any alteration of the relationship of his mandible to his maxilla has occurred. To obtain the maximum amount of diagnostic information, it is necessary that the diagnostic casts analyzed be made in a uniform manner. However, using conventional techniques and apparatus standardized casts which can be readily compared in order to secure the desired anatomical information are not readily secured.

Now, in accordance with the present invention, it has been discovered that with the use of certain maxillary anatomic landmarks and the orthopedic relator assembly of the present invention, scientifically duplicatable diagnostic casts can be readily and simply formed. The orthopedic relator assembly consists of four principal parts, namely, a lower mandibular base member, an upper maxillary base member, an occlusal base member, and a vertically disposed support means whose upper and lower ends are preferably vertically movable in relation to each other. The lower mandibular base and the upper maxillary base are connected to the vertically disposed support means and, in operating condition, the lower surface of the maxillary base and the upper surface of the mandibular base are maintained in planes parallel to each other.

The upper surface of the mandibular base member and the lower surface of the maxillary base member are each provided with cast positioning means. The occlusal base is removably mounted on the upper surface of the mandibular base and the upper surface of the occlusal base is positioned in a plane parallel to the lower surface of the maxillary base and the upper surface of the mandibular base. On the upper surface of the occlusal base is provided a straight guide line, a pin holder positioned on the guide line and a movable knife edge.

The invention will be more readily understood by reference to the accompanying drawings in which.

Figure 1:
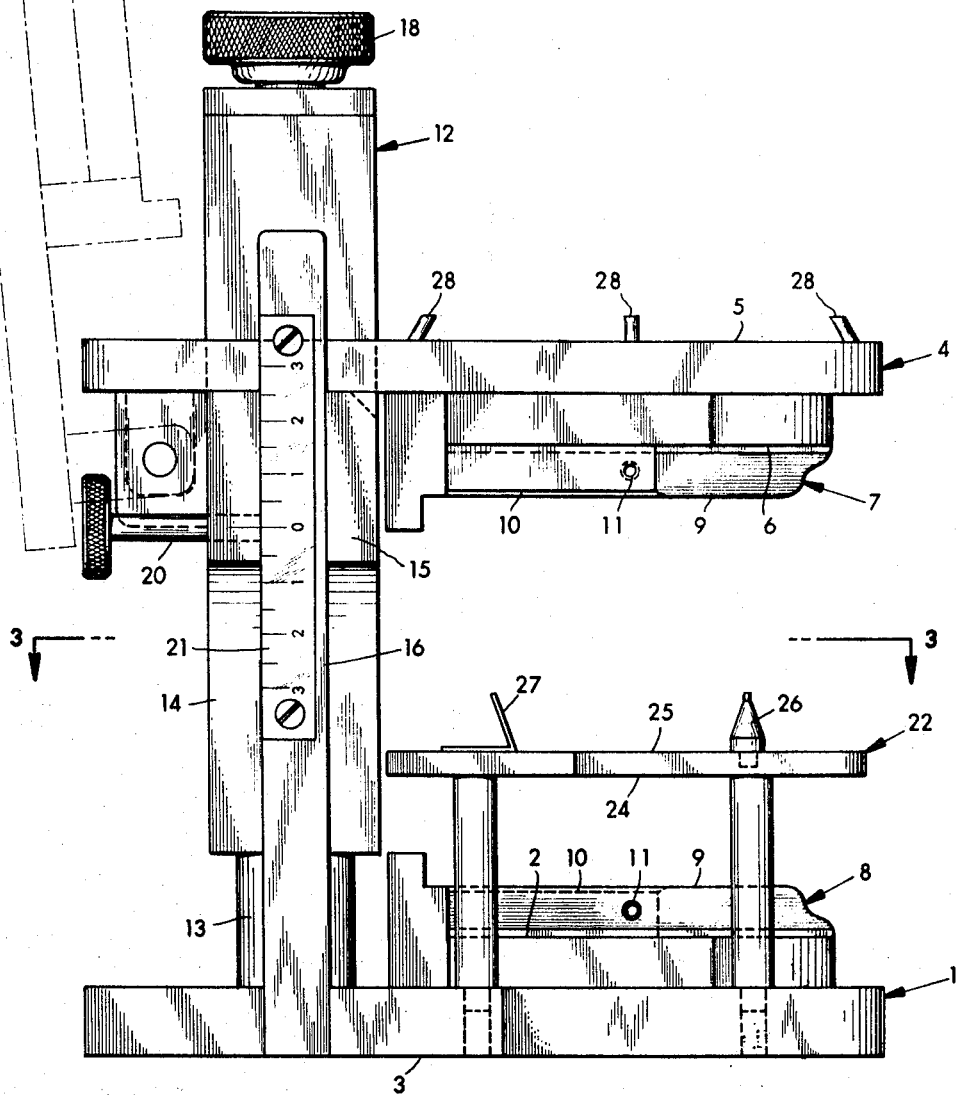
FIGURE 1 is a side elevational view of the orthopedic relator assembly in which the maxillary base is shown in the open and closed position.

Turning now to the drawings, numeral 1 represents the mandibular base member having an upper surface 2 and a lower surface 3. Reference numeral 4 designates the maxillary base member of the orthopedic relator assembly. Maxillary base member 4 has an upper surface 5 and a lower surface 6. To the lower surface of the maxillary base member and upper surface of the mandibular base member are connected cast positioning means 7 and 8. Cast positioning means 7 and 8 are composed of blades 9 integrally connected to elongated backing members 10. Blades 9 form the forward projections of the cast positioning means. Backing member 10 is optionally provided with hole 11 that is adapted to receive a tapered pin (not shown). The tapered pins are inserted into holes 11 during cast forming operations and afford a means of rigidly positioning finished cast onto blade 9 and backing member 10.

The maxillary base member is maintained in position above and its lower surface held essentially parallel to the upper surface of the mandibular base member by means of vertically disposed support means 12. Column 13 forms the lowermost portion of support means 12. The maxillary base member 4 is connected to cross bar 15 that is integrally attached to sleeve 14. Sleeve 14 slidably engages column 13. The outer terminal portion of cross bar 15 is bifurcated and adapted to slide over the outer lateral surfaces of post 16. Column 13 and post 16 are rigidly affixed to the mandibular base member 21. Preferably, the maxillary base member 4 is pivotably mounted on the cross bar 15 of support structure 12 as this arrangement permits the facile formation of maxillary and mandibular casts. In FIGURE 1, the maxillary base member is shown in both the open and closed positions. When the maxillary base member 4 is in the closed position, it is necessary that its lower surface be maintained absolutely parallel to the lower surface of the mandibular base member 1.

Figure 2:
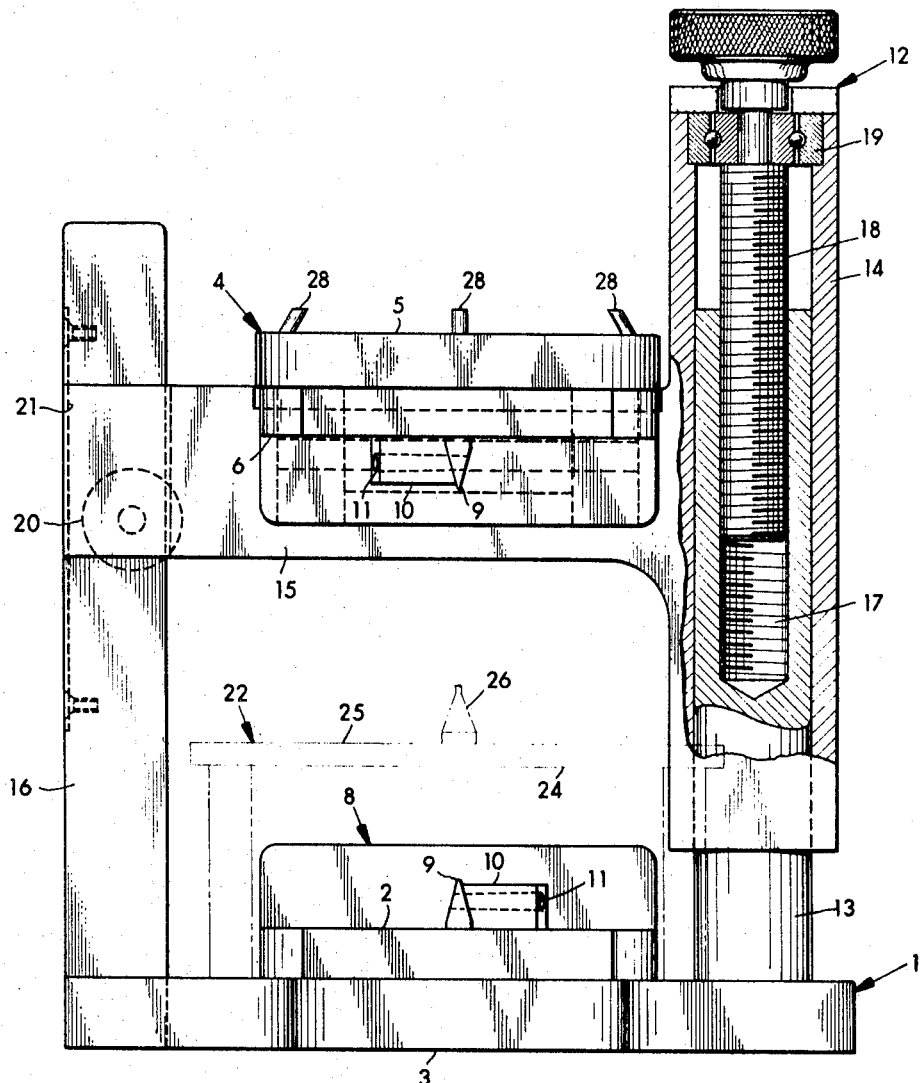
FIGURE 2 is a front elevational view of the orthopedic relator assembly.
Figure 2:
Figure 3:
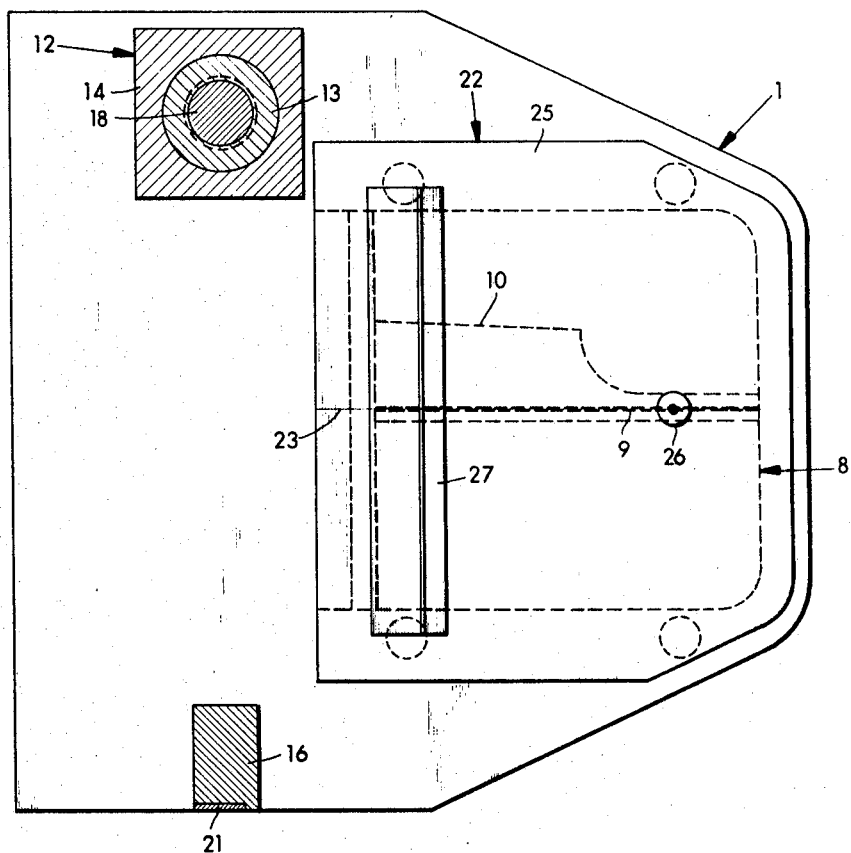
FIGURE 3 is a view of the top surface of the occlusal base taken along line 3—3 of FIGURE 1. Similar numerals refer to similar parts in the various figures.

Optionally, and as depicted in FIGURES 1 and 2, the support member 12 may be provided with means permitting the maxillary base member 4 to be moved vertically to and away from the mandibular base member 1. Vertical movement of the maxillary base member 4 with respect to the mandibular base member 1 is conveniently obtained by providing column 13 with an internally threaded axial bore 17 and supplying sleeve 14 with a suitable adjusting screw 18 that is adapted to engage the threaded surface of the bore 17. Adjusting screw 18 is maintained in position within sleeve 14 by means of bearings 19. The maxillary base member is locked into position at any given vertical level above the mandibular base member by means of set screw 20. Set screw 20 frictionally engages post 16 when in the closed position. Supplying the orthopedic relator assembly with means for vertically moving the maxillary base member in relation to the mandibular base and a suitable scale 21, which is used to determine the extent of vertical movement, is necessary only if the total assembly is used to determine change in vertical dimension of the patient's tooth structure.

Positioned on the upper surface of mandibular base 1 is occlusal base 22. The upper surface 25 of the occlusal base 22 is maintained in position in a plane parallel to the lower surface of maxillary base 4 and the upper surface of mandibular base 1 by means of legs that are located about the outer periphery of the lower surface 24 of the occlusal base 22. Occlusal base 22 is provided with a straight guide line 23 which is etched onto or applied to the upper surface 25 of occlusal base 22. The guide line preferably intersects the upper surface 25 of the occlusal base and lies in a plane perpendicular to the longitudinal planar axis of the support means 12. The guide line runs longitudinally along the central portion of the upper surface of the occlusal base. Located on the upper surface 25 of occlusal base 22 is a pin holder 26 and a knife edge 27. The pin holder and knife are of substantially the same vertical height. Pin holder 26 is positioned on guide line 23 preferably forward of the midpoint of guide line 23. Knife edge 27 is not necessarily mechanically attached to the occlusal base; however, if attached, the knife edge should be free to move both forward and backward from the pin holder 26 and it must also be free to rotate within an angle of about 45° on the surface of the occlusal base.

As stated previously, the principal use of the present orthopedic relator assembly is in the formation of standardized diagnostic dental casts. In forming these standardized dental casts, an anatomic impression of the maxilla of the patient is first taken. The maxilla impression must include a good outline of the hamular notches and the anterior palatine papilla. A pin or rod is then positioned in the impression at the midpoint of the papilla. A rough cast is then prepared by pouring plaster or any other suitable casting medium into the initial impression again making sure to include the hamular notches of the impression. The cast is then separated from the impression, trimmed to remove excess plaster, and the pin or rod cut to a length of about 2 to 5 millimeters above the surface of the midpoint of the papilla. The rough cast is then marked by drawing a line from the center of the second set of rugae to the center of the fovea palatini. This straight line is then transferred to the base of the rough cast.

A completed maxillary cast is formed by inserting the pin or rod positioned on the cast within pin holder 26. The hamular notches of the cast are then located on knife edge 27 and the line earlier placed on the base of the cast oriented with the guide line 23 located on the upper surface 25 of occlusal base 22. Since the pin holder 26 and knife edge 27 are substantially the same height, the anterior palatine papilla and hamular notches of the cast will be located the same distance from the upper surface of the occlusal base. The anterior palatine papilla and the hamular notches, which define the hamular-incise plane, are therefore parallel to the upper surface of the occlusal base. The maxillary base member of the orthopedic relator assembly is then pivoted to the open position and an elongated tapered pin placed through hole 11 located in backing member 10. Mounting plaster is poured onto the base of the cast. The maxillary base member is then moved to the closed position as depicted in FIGURE 2. Sufficient plaster should be used so that the knife edge 9 is completely enclosed by plaster and at least a portion of the backing member covered by the plaster. Since the lower surface of the maxillary base is parallel to the upper surface of the occlusal base, the hamular-incisive plane is also so oriented and a cast is formed whose base is parallel to the plane of occlusion or the hamular-incisive plane.

A completed diagnostic cast system is secured by taking a mandibular impression of the mouth of the patient being careful to incorporate the retromolar pads and the genial tubercles. A rough cast is then formed from this impression following the techniques previously mentioned. The occlusal base 22 of the orthopedic relator assembly is then removed from mandibular base 1 and a tapered pin placed through hole 11 of backing member 10 located on the upper surface of the mandibular base member. The rough mandibular cast is then placed upon the dental structure of the completed maxillary cast and held in place with elastic bands whose ends are secured around studs 28 that are positioned on the upper surface 5 of the maxillary base member.

The uncompleted cast structure made up of the completed maxillary cast and of the rough mandibular cast is moved away from the mandibular base by pivoting the maxillary base to an open position. Fresh plaster is then poured onto the cast positioning means located on the upper surface of the mandibular base in amounts sufficient to completely cover knife edge 9 and at least partially enclose backing member 10. The cast structure is then lowered into the fresh plaster making sure that the lower surface of the maxillary base is absolutely parallel to the upper surface of the mandibular base. After the plaster has been permitted to dry, the elastic bands are trimmed away and the completed cast structure obtained. The finished casts are removed from the orthopedic relator assembly by removing the tapered pins from each of the backing members and laterally sliding the cast forward off the cast positioning means.

As depicted in FIGURE 2, the knife edges 9 of each of the cast positioning means are preferably located in the same vertically extending plane as the guide line 23. This plane preferably lies perpendicular to the lower surface of the maxillary, and upper surfaces of the occlusal and mandibular bases. Although it is not necessary that the knife edges 9 of each cast positioning means lie in the same vertically extending plane (disposed perpendicular to the operating surfaces of the base members) with the occlusal base guide line, additional data is secured from casts formed with an orthopedic relator assembly having the preferred structure. For example, when the maxillary knife edge is positioned directly over the guide line of the occlusal base the resulting identation in the base of the finished maxillary cast is the maxillary suture midline and not the midline as indicated by the maxillary central incisors which may shift over a period of time.

What is claimed is:

1. An orthopedic relator assembly useful for converting rough maxilla and mandible casts to diagnostic dental casts having bases that are parallel to the hamular-incisive plane comprising a horizontally disposed mandibular base member having an upper and lower surface, a vertically disposed support means having an upper and lower portion, said lower portion connected to said mandibular base, a maxillary base member having an upper and lower surface, the lower surface connected to the upper portion of said support means, the lower surface of said maxillary base member adapted to be positioned in a plane parallel to the upper surface of the mandibular base member, cast positioning means located on the upper surface of the mandibular base member and on the lower surface of the maxillary base member, said cast positioning means adapted to locate the said diagnostic casts relative to each other, and an occlusal base member having an upper and lower surface located between the mandibular and maxillary bases, the upper surface of the occlusal base located in a plane parallel to the upper surface of the mandibular base and the lower surface of the maxillary base, said occlusal base having located on its upper surface a straight guide line running longitudinally along the central portion of the upper surface of the occlusal base, a vertically extending pin holder located on the forward portion of said guide line and a movable knife edge of subtantially the same height as said pin holder located rearward of said pin holder, said guide line, pin holder and knife edge adapted to locate the said rough maxilla cast on the upper surface of said occlusal base member, said knife edge adapted to engage the hamular notches of said rough maxilla cast, said pin holder adapted to engage the pin positioned rear the midpoint of the palatine papilla of said rough maxilla cast and said guide line adapted to orient said cast on said occlusal base.

2. The apparatus of claim 1 wherein the maxillary base is pivotally mounted on said vertically extending support means.

3. The apparatus of claim 1 wherein the upper portion of said support means is vertically movable in relation to the lower portion of said support member.

4. The apparatus of claim 1 wherein said cast positioning means are composed of a forward knife edge integrally connected to an elongated backing member.

5. The apparatus of claim 4 wherein the knife edges of each of the cast positioning means and the occlusal base guide line are located in a vertical plane, said plane perpendicularly disposed to the upper surfaces of the occulsal and mandibular bases and the lower surface of maxillary base.

6. The apparatus of claim 1 wherein said vertically extending pin holder is positioned forward of the midpoint of the occlusal base guide line.

7. The apparatus of claim 1 wherein said occlusal base member is removably connected to the mandibular base member.

8. The apparatus of claim 7 wherein the knife edges of each of the casts positioning means and the occlusal base guide line are located in a vertical plane, said plane perpendicularly disposed to the upper surfaces of the occlusal and mandibular bases and the lower surface of the maxillary base.

References Cited
UNITED STATES PATENTS

| | | | |
|---|---|---|---|
| 2,003,727 | 6/1935 | Tofflemire | 32—32 |
| 2,952,914 | 9/1960 | Shackelford | 32—32 |
| 3,018,551 | 1/1962 | Weiss | 32—32 |

ROBERT PESHOCK, Primary Examiner